April 16, 1946.  C. F. PROUDMAN ET AL  2,398,397

GRASS CUTTER

Filed Oct. 20, 1944

INVENTORS
Chester F. Proudman
BY Henry H. Goossen
Pennie Davis Marvin Edmonds
ATTORNEYS Patented Apr. 16, 1946

2,398,397

UNITED STATES PATENT OFFICE 2,398,397

GRASS CUTTER

Chester F. Proudman and Henry H. Goossen,
New Canaan, Conn.

Application October 20, 1944, Serial No. 559,576

10 Claims. (Cl. 56—289)

This invention relates to devices for cutting weeds and tall grass stems which are likely to be bent down and passed over by a lawn mower of ordinary rotary construction without being cut, so that they must be later cut by hand clippers. More particularly, the invention is concerned with a novel device for the purpose which may be used alone or as an attachment to a lawn mower and offers numerous advantages over prior similar devices.

Stray grass cutters have been proposed heretofore, but the prior devices with which we are familiar, are open to various objections, particularly in that they are somewhat expensive to construct, and are difficult and expensive to keep the cutting elements of them sharp and in good condition.

The present invention is directed to the provision of a device for cutting stray grass, etc., which is of simple, inexpensive construction, and can be kept in working order easily and at low cost. The cutting elements of the new device are thin, double-edged blades, which may be ordinary razor blades, and these elements are mounted on a plate formed with teeth in its forward edge. The teeth direct the stems to be cut against the edges of the blades at an angle, as the device is moved over the lawn, so that the stems are gradually severed with a long cutting stroke. The cutting elements are held in position on the plate by clamping means which afford them the necessary support, so that they will not flex and be broken, and can be readily removed and replaced when new blades are to be put in place. The plate on which the cutting elements are mounted may be attached to a suitable part of the lawn mower, but is, preferably, carried by a pair of rollers. The device may then be provided with a handle, so that it can be used alone or it may be secured to the handle of the mower in position to cut the stems as they spring back after the mower has passed over them.

For a better understanding of the invention, reference may be had to the accompanying drawing, in which Fig. 1 is a sectional view of the device on the line 1—1 of Fig. 2;

Figure 1:
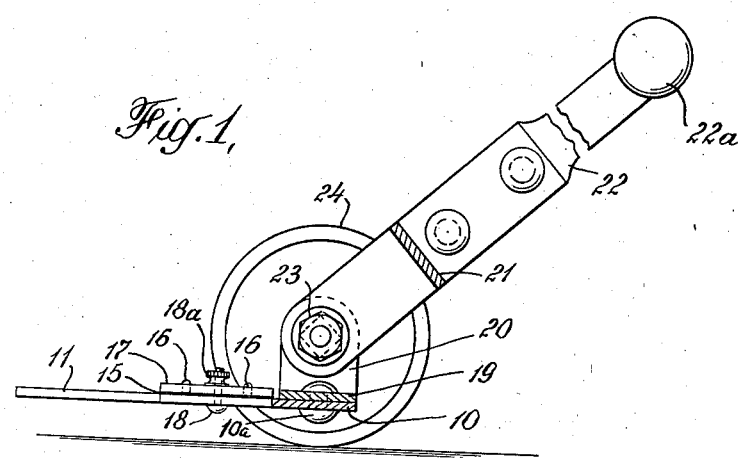

The cutting device of the invention, as shown in the drawing, comprises a plate 10 which may be made of sheet metal and of any suitable length. In the event that the device is to be used as an attachment to a lawn mower, the length of the plate is preferably the same as the length of the reel of the mower. The plate is formed along its forward edge with pointed stray-grass-guiding teeth 11, which are similar to saw teeth and have converging lateral edges 12, 12a with the opposed edges of adjacent teeth defining inwardly-converging recesses, the apices of which terminate in acute angles 13. From a point 14 about midway of the length of the teeth, the acuteness of the angle between the edges increases somewhat.

A cutting element 15 is mounted on each of the alternate teeth along the plate 10, and the outer end of each blade terminates about at the line where the acuteness of the angle 13 begins to increase. Each cutting blade is of oblong shape and it has cutting edges along its longer sides. The dimensions of the blade are such that the cutting edges project beyond the teeth on which they are mounted and extend into the spaces between adjacent teeth. At their inner ends, the cutting edges of each blade preferably overlap the edges of the teeth on opposite sides of the tooth on which the blade is mounted. To hold the cutting blades against shifting, the plate 10 may be provided with lugs 16 in its upper surface, which enter openings in the blades. Each blade is also held in place and prevented from flexing by a clamping plate 17 which covers a major area of the blade to which it is applied, and is, preferably, formed with its outer end 17a somewhat narrower than its inner end. The clamping plate secures its blade in position with the edges of the latter exposed but with little of the blade unsupported and free to be flexed. Each clamping plate is held in clamping position by a bolt 18 which passes through the clamping plate, the blade, and plate 10 and is provided with a knurled nut 18a.

Figure 2:
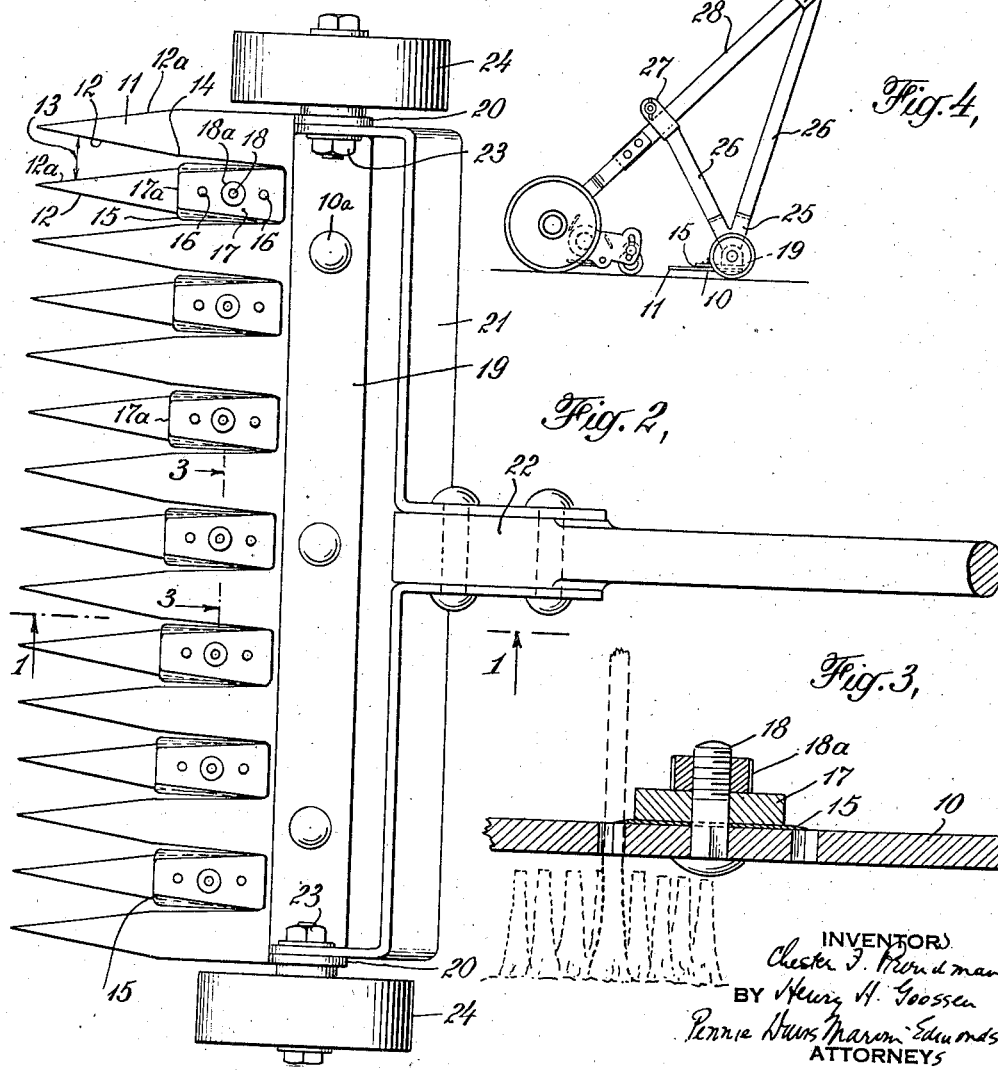
Fig. 2 is a plan view of the device.
Figure 3:
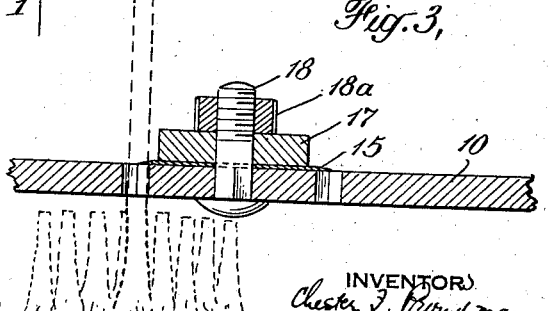
Fig. 3 is a sectional view on the line 3—3 of Fig. 2 on an enlarged scale.

The plate 10 is secured in any suitable manner, as by rivets 10a, to another plate 19 formed with upstanding end pieces 20. In the construction shown in Figs. 1 and 2, a bracket 21 is attached to each end piece 20, and these brackets extend toward one another and have ends bent to be parallel. A handle 22 is secured between the ends of the brackets and it extends to a convenient height and is provided with a cross-bar 22a. Each end piece 20 and its bracket 21, are secured together by a bolt 23 which serves as the axle on which a roller 24 is free to rotate. With this arrangement, the device may be moved over the ground by means of handle 22, and the plate 10 with the cutting blades thereon may be kept parallel with the ground, as shown in Fig. 1, or held at an angle thereto by tilting of the handle to swing the plate 10 and teeth 11 about the axis of the bolts 23.

Figure 4:
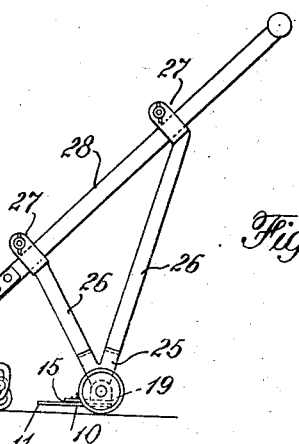
Fig. 4 is a view in side elevation of a lawn mower to the handle of which the new device is attached.

The form of the device shown in Fig. 4 is adapted for use as an attachment to an ordinary lawn mower, and the device includes the plate 10 with the cutting elements and clamping plates therefor. Plate 10 is attached to a plate 19, as in the Fig. 1 construction. Plate 19 is provided with upstanding end portions to which may be attached brackets 25, similar to brackets 21, but provided with bifurcated ends between which are secured bars 26. The bars carry clamps 27 at their ends by which they can be connected to the handle 28 of a lawn mower.

As the device is moved over the ground, the weeds and tall grass stems are engaged by the edges of the teeth 11 and directed inwardly until they strike the edges of the cutting elements. The cutting edges of each blade project into the spaces between adjacent teeth, and at the inner ends of such spaces, the blades slightly overlap the teeth on either side of those on which they are mounted. This insures that as the blades are moved relatively to the stems, the latter will be entirely cut through and will fall to the rear and be left behind. Ordinarily, the device will be moved over the ground with the plate 10 generally parallel thereto, but, in the event that the weeds, etc., have been bent over, the device can be tilted forwardly to cause the teeth 11 to pick up bent-over stems and cause them to be directed to the cutting blades.

The blades are preferably standard double-edged razor blades, and the teeth of plate 10 are so formed that such blades may be employed. While new razor blades may be used, if desired, blades that are no longer suitable for shaving are sufficiently sharp for grass cutting purposes, and such blades may be used for a considerable period of time without attention. When the blades become dull, they may be removed and replaced by others. Since used razor blades are readily obtainable by the average householder, the expense of maintaining the device is a minimum, and no grinding of cutter elements is necessary as in prior devices.

We claim:

1. In a cutting device for stray grass, the combination of a plate having a series of stray-grass-guiding teeth in its forward edge forming a series of recesses between them, and double-edged cutting blades mounted removably on alternate teeth at the base thereof, the edges of each blade extending beyond the edges of the tooth on which it is mounted, whereby stray grass guided into any recess between the teeth is severed by cooperation of one cutting edge of a blade and the adjacent edge of the adjacent tooth.

2. In a cutting device for stray grass, the combination of a plate having a series of stray-grass-guiding teeth in its forward edge forming a series of recesses between them, and a cutting blade having opposite parallel cutting edges mounted removably on each of the alternate teeth at the base thereof, both edges of each blade projecting beyond the edges of the tooth on which it is mounted, whereby stray grass guided into any recess between the teeth is severed by cooperation of one cutting edge of a blade and the adjacent edge of the adjacent tooth.

3. A cutting device for stray grass which comprises a plate having a series of saw teeth in its forward edge forming a series of inwardly-converging recesses between them, double-edged cutting blades mounted removably on alternate teeth at the base thereof, the edges of each blade extending beyond the edges of the tooth on which it is mounted, whereby stray grass guided into any recess between the saw teeth is severed by cooperation of one cutting edge of a blade and the adjacent edge of the adjacent tooth, and a rolling support on which the plate is mounted.

4. In a cutting device for stray grass, the combination of a plate having a series of stray-grass-guiding teeth in its forward edge forming a series of recesses between them, the opposed edges of adjacent teeth meeting to define an acute angle, a double-edged flexible blade mounted on each of the alternate teeth, each blade having side edges projecting outwardly beyond the edges of the tooth on which it is mounted and into the recesses between that tooth and those on opposite sides thereof, whereby stray grass guided into any recess between the teeth is severed by cooperation of one cutting edge of a blade and the adjacent edge of the adjacent tooth, and a clamping member for securing each blade in position.

5. In a cutting device for stray grass, the combination of a main plate having a series of saw teeth in its forward edge forming a series of inwardly-converging recesses between them, cutting blades mounted on alternate teeth, each blade being of thin flexible metal and having parallel cutting edges extending forwardly of the plate and projecting into the recesses between the tooth on which the blade is mounted and the teeth on opposite sides thereof, whereby stray grass guided into any recess between the saw teeth is severed by cooperation of one cutting edge of a blade and the adjacent edge of the adjacent tooth, and a clamping plate overlying each blade and clamping it against the main plate, the main and clamping plates holding substantially all of each blade except the cutting edges thereof between them.

6. In a cutting device for stray grass, the combination of a plate having a series of saw teeth in its forward edge forming a series of inwardly-converging recesses between them, cutting blades of the double-edged razor blade type mounted on alternate teeth at the roots thereof, each blade spanning the tooth on which it is mounted and having its edges overlapping the edges of the adjacent teeth at the inner ends of such edges and elsewhere lying in the recesses between the tooth on which it is mounted and the adjacent teeth, whereby stray grass guided into any recess between the saw teeth is severed by cooperation of one cutting edge of a blade and the adjacent edge of the adjacent tooth, and means for clamping the blades against the teeth on which they are mounted and preventing flexing of said blades.

7. In a cutting device for stray grass, the combination of a main plate having a series of stray-grass-guiding teeth in its forward edge forming a series of recesses between them, the opposed edges of adjacent teeth meeting to define an acute angle, cutting blades mounted on the alternate teeth at the roots thereof, each blade having parallel cutting edges extending forwardly, the width of the blade being such that the blade projects beyond the edges of the tooth on which it is mounted and its cutting edges overlap the edges of the adjacent teeth at the inner ends of such edges, whereby stray grass guided into any recess between the teeth is severed by cooperation of one cutting edge of a blade and the adjacent edge of the adjacent tooth, a clamping plate overlying each blade to expose substantially only the cutting edges thereof, means for securing the clamping plates to the main plate, and a rolling support on which the main plate is mounted.

8. A cutting device for stray grass which comprises a plate having a series of saw teeth formed in its forward edge forming a series of inwardly-converging recesses between them, a plurality of double edged cutting blades mounted on alternate teeth at the roots thereof, each blade having parallel cutting edges extending forwardly, the cutting edges of each blade projecting into the recesses between adjacent teeth and overlapping the edges of adjacent teeth at the inner ends of such edges, whereby stray grass guided into any recess between the saw teeth is severed by cooperation of one cutting edge of a blade and the adjacent edge of the adjacent tooth, a pair of rollers attached to the plate at opposite ends thereof, and a handle attached to the plate.

9. A cutting device for stray grass which is adapted to be used as an attachment to a lawn mower and comprises a main plant having a series of saw teeth formed in its forward edge forming a series of inwardly-converging recesses between them, a plurality of double edged cutting blades mounted removably on the plate at the roots of alternate teeth, the edges of each blade extending beyond the edges of the tooth on which it is mounted into the recesses between that tooth and those on opposite sides thereof, whereby stray grass guided into any recess between the saw teeth is severed by cooperation of one cutting edge of a blade and the adjacent edge of the adjacent tooth, a clamping plate overlying each blade and attached to the main plate to hold the blade in place and to maintain it against flexing, a rolling support on which the main plate is mounted, and means for attaching the support to the handle of the lawn mower.

10. A cutting device for stray grass which is adapted to be used as an attachment to a lawn mower and comprises a main plate having a series of saw teeth formed in its forward edge forming a series of inwardly-converging recesses between them, a plurality of double edged cutting blades mounted removably on the plate at the roots of alternate teeth, the edges of each blade extending beyond the edges of the tooth on which it is mounted into the recesses between that tooth and those on opposite sides thereof, whereby stray grass guided into any recess between the saw teeth is severed by cooperation of one cutting edge of a blade and the adjacent edge of the adjacent tooth, a clamping plate overlying each blade and attached to the main plate to hold the blade in place and maintain it against flexing, and means for attaching the main plate to a part of the lawn mower.

CHESTER F. PROUDMAN.
HENRY GOOSSEN.